US012652215B1

(12) United States Patent
Khandelwal et al.

(10) Patent No.: US 12,652,215 B1
(45) Date of Patent: Jun. 9, 2026

(54) DIAGNOSING AND REMEDYING OF ERRORS, FAULTS, AND/OR FAILURES WITHIN A SERVICE PROVIDER NETWORK

(71) Applicant: CSC Holdings, LLC, Bethpage, NY (US)

(72) Inventors: Rajesh Khandelwal, Princeton Junction, NJ (US); Shashank Somal, Levittown, NY (US)

(73) Assignee: CSC Holdings, LLC, Bethpage, NY (US)

( * ) Notice: Subject to any disclaimer, the term of this patent is extended or adjusted under 35 U.S.C. 154(b) by 29 days.

(21) Appl. No.: 18/455,770

(22) Filed: Aug. 25, 2023

Related U.S. Application Data

(63) Continuation of application No. 17/138,679, filed on Dec. 30, 2020, now abandoned.

(51) Int. Cl.
| | |
|---|---|
| *G06F 11/36* | (2025.01) |
| *G06N 20/00* | (2019.01) |
| *H04L 41/0631* | (2022.01) |
| *H04L 41/0654* | (2022.01) |
| *H04L 41/142* | (2022.01) |
| *H04L 41/22* | (2022.01) |
| *H04L 41/5074* | (2022.01) |

(52) U.S. Cl.
CPC ......... *H04L 41/0654* (2013.01); *G06N 20/00* (2019.01); *H04L 41/0631* (2013.01); *H04L 41/142* (2013.01); *H04L 41/22* (2013.01); *H04L 41/5074* (2013.01)

(58) Field of Classification Search
CPC .............................. G06N 20/00; G06F 11/36
See application file for complete search history.

(56) References Cited

U.S. PATENT DOCUMENTS

| | | | | |
|---|---|---|---|---|
| 9,710,122 | B1 * | 7/2017 | Pillay ..................... | G06F 3/048 |
| 2002/0128728 | A1 * | 9/2002 | Murakami .......... | G06F 11/2294 |
| | | | | 714/E11.173 |
| 2005/0030924 | A1 * | 2/2005 | Yano ................... | H04W 36/302 |
| | | | | 370/332 |

(Continued)

*Primary Examiner* — Kamini B Patel
(74) *Attorney, Agent, or Firm* — Lowenstein Sandler LLP

(57) ABSTRACT

Systems, methods, and apparatuses disclosed herein can diagnose one or more potential sources of various errors, faults, and/or failures within the service provider network and/or to identify various recommended actions to be performed on these one or more potential sources to remedy the errors, faults, and/or failures. These systems, methods, and apparatuses can execute one or more diagnostic tools to identify the one or more potential sources for the errors, faults, and/or failures and/or to identify the recommended actions to be performed on these one or more potential sources to remedy these errors, faults, and/or failures. These systems, methods, and apparatuses effectively combine the different conventional diagnostic tools into a seamless interactive visual interface to provide a holistic view of one or more customer premises within the service provider network. This allows personnel of the service provider network to quickly and/or accurately identify the one or more potential sources for the errors, faults, and/or failures and/or identify the recommended actions to be performed on these one or more potential sources to remedy these errors, faults, and/or failures.

19 Claims, 6 Drawing Sheets

(56)　　　　　References Cited

U.S. PATENT DOCUMENTS

| | | | |
|---|---|---|---|
| 2013/0132850 A1* | 5/2013 | Subramanian .......... | H04L 41/22 |
| | | | 715/735 |
| 2015/0106265 A1* | 4/2015 | Stubblefield ....... | G06Q 20/4016 |
| | | | 705/325 |
| 2016/0117646 A1* | 4/2016 | Lerick ................ | G06Q 10/1095 |
| | | | 705/7.21 |
| 2017/0006434 A1* | 1/2017 | Howe ................ | G06Q 20/3224 |
| 2021/0004284 A1* | 1/2021 | Vah ........................ | G06N 20/20 |
| 2022/0122183 A1* | 4/2022 | Jacob ................... | G06F 11/323 |
| 2022/0173958 A1* | 6/2022 | Triplet .................. | G06N 5/025 |

* cited by examiner

200

CATALOG ONE OR MORE
SYMPTOMS OF ERRORS, FAULTS,
AND/OR FAILURES ⟩— 202

RETRIEVE ELECTRONIC
DEVICE INFORMATION ⟩— 204

DIAGNOSE ONE OR MORE
POTENTIAL SOURCES OF THE
ERRORS, FAULTS, AND/OR
FAILURES ⟩— 206

IDENTIFY ONE OR MORE
RECOMMENDED ACTIONS TO BE
PERFORMED ON THE ONE OR
MORE POTENTIAL SOURCES ⟩— 208

PERFORM THE ONE OR MORE
RECOMMENDED ACTIONS ⟩— 210

306

300

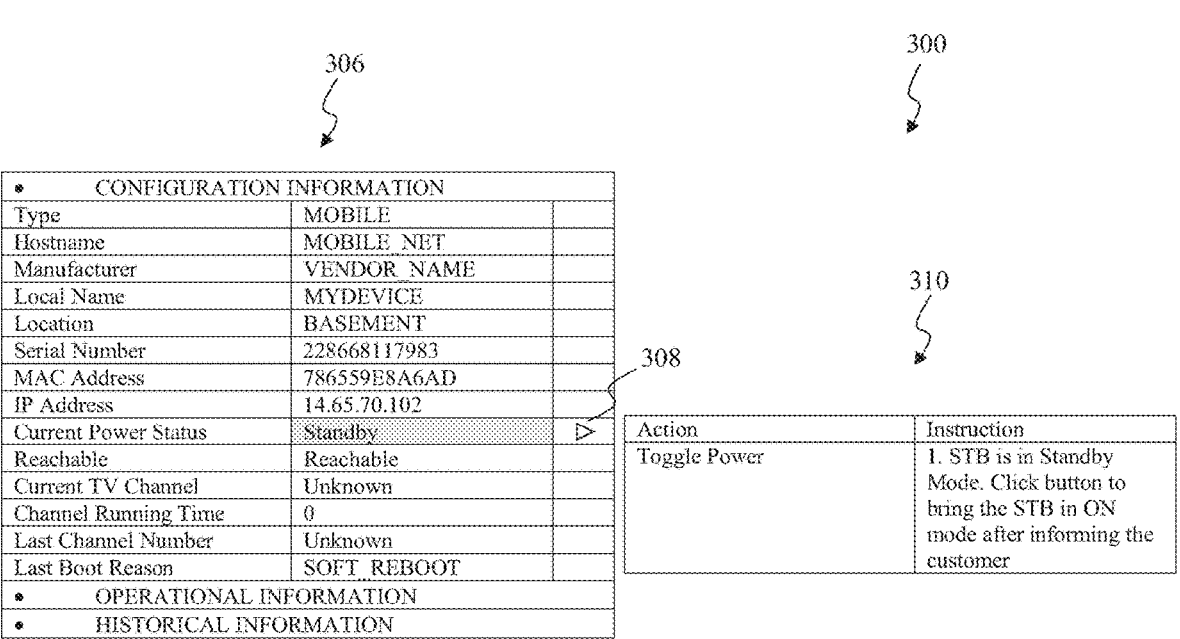

| CONFIGURATION INFORMATION | |
|---|---|
| Type | MOBILE |
| Hostname | MOBILE_NET |
| Manufacturer | VENDOR_NAME |
| Local Name | MYDEVICE |
| Location | BASEMENT |
| Serial Number | 228668117983 |
| MAC Address | 786559E8A6AD |
| IP Address | 14.65.70.102 |
| Current Power Status | Standby |
| Reachable | Reachable |
| Current TV Channel | Unknown |
| Channel Running Time | 0 |
| Last Channel Number | Unknown |
| Last Boot Reason | SOFT_REBOOT |
| OPERATIONAL INFORMATION | |
| HISTORICAL INFORMATION | |

308

310

| Action | Instruction |
|---|---|
| Toggle Power | 1. STB is in Standby Mode. Click button to bring the STB in ON mode after informing the customer |

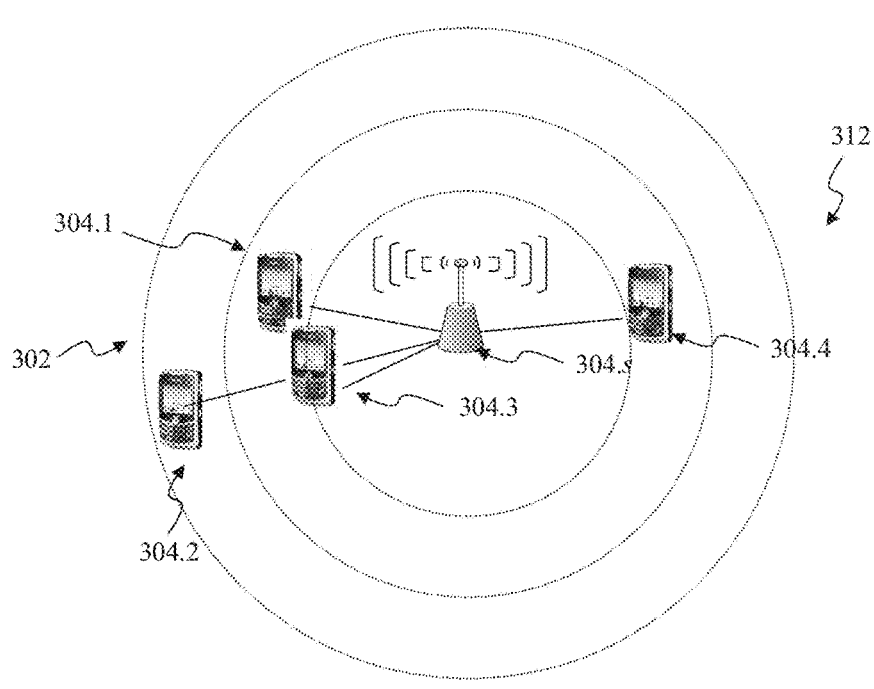

400
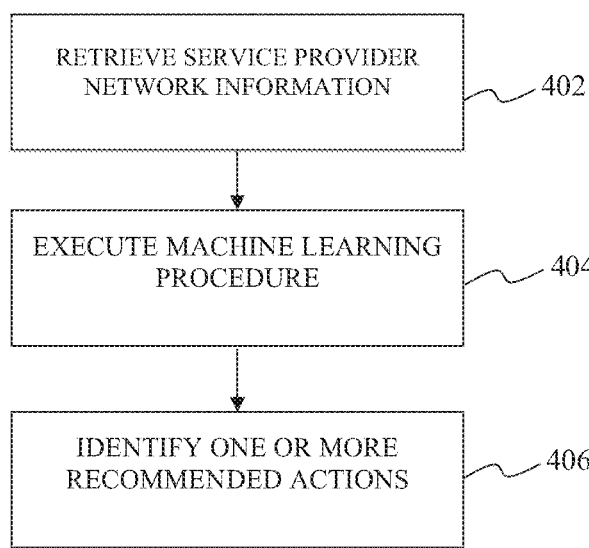
RETRIEVE SERVICE PROVIDER
NETWORK INFORMATION                     402
EXECUTE MACHINE LEARNING
PROCEDURE                               404
IDENTIFY ONE OR MORE
RECOMMENDED ACTIONS                     406
FIG. 4

SERVICE PROVIDER NETWORK INFORMATION
502

$A_1X_1 + A_2X_2 + \ldots + A_KX_K = Y$

504

NUMERICAL COEFFICIENT OPERATION
506

508

ACTION
510.1

• • •

ACTION
510m

DIAGNOSING AND REMEDYING OF ERRORS, FAULTS, AND/OR FAILURES WITHIN A SERVICE PROVIDER NETWORK

CROSS-REFERENCE TO RELATED APPLICATIONS

The present application is a continuation of U.S. patent application Ser. No. 17/138,679, filed Dec. 30, 2020, which is incorporated herein by reference in its entirety.

BACKGROUND

A service provider network provides a service, such as communication of video, audio, and/or data to provide some examples, to one or more electronic devices associated with a subscriber of the service. In some situations, the subscriber of the service contacts personnel of the service provider network to indicate the service is not performing as expected. Conventionally, the service provider network utilizes multiple conventional diagnostic tools to diagnose errors, faults, and/or failures relating to the operation of the service provider network. Each of these conventional diagnostic tools is custom tailored to diagnose or to collect information on a specific make, model, type or brand of electronic device within the service provider network. For example, diagnosing errors, faults, and/or failures within electronic media devices of the service provider network requires a different diagnostic tool than diagnosing errors, faults, and/or failures within access nodes of the service provider network.

Often times, the information gathered by these different diagnostic tools can be overwhelming. For example, the personnel of the service provider network must be able to understand and to interpret the information gathered by these different diagnostic tools, which is often in different forms or formats. Often times, the personnel of the service provider network piece together information gathered by these different diagnostic tools to identify solutions to the errors, faults, and/or failures within the service provider network. This requires the personnel of the service provider network to understand various, often complex, technologies, products, and/or services to correctly select the proper diagnostic tool from among all the different diagnostic tools to gather the information to diagnose the errors, faults, and/or failures within the service provider network.

BRIEF DESCRIPTION OF THE DRAWINGS/FIGURES

The present disclosure is described with reference to the accompanying drawings. In the drawings, like reference numbers indicate identical or functionally similar elements. Additionally, the left most digit(s) of a reference number identifies the drawing in which the reference number first appears. In the accompanying drawings:

FIG. 1 graphically illustrates an exemplary service provider network according to an exemplary embodiment of the present disclosure;

FIG. 3 illustrates an exemplary diagnostic interface for an exemplary diagnostic tool according to an exemplary embodiment of the present disclosure;

Figure 5:
Figure 6:
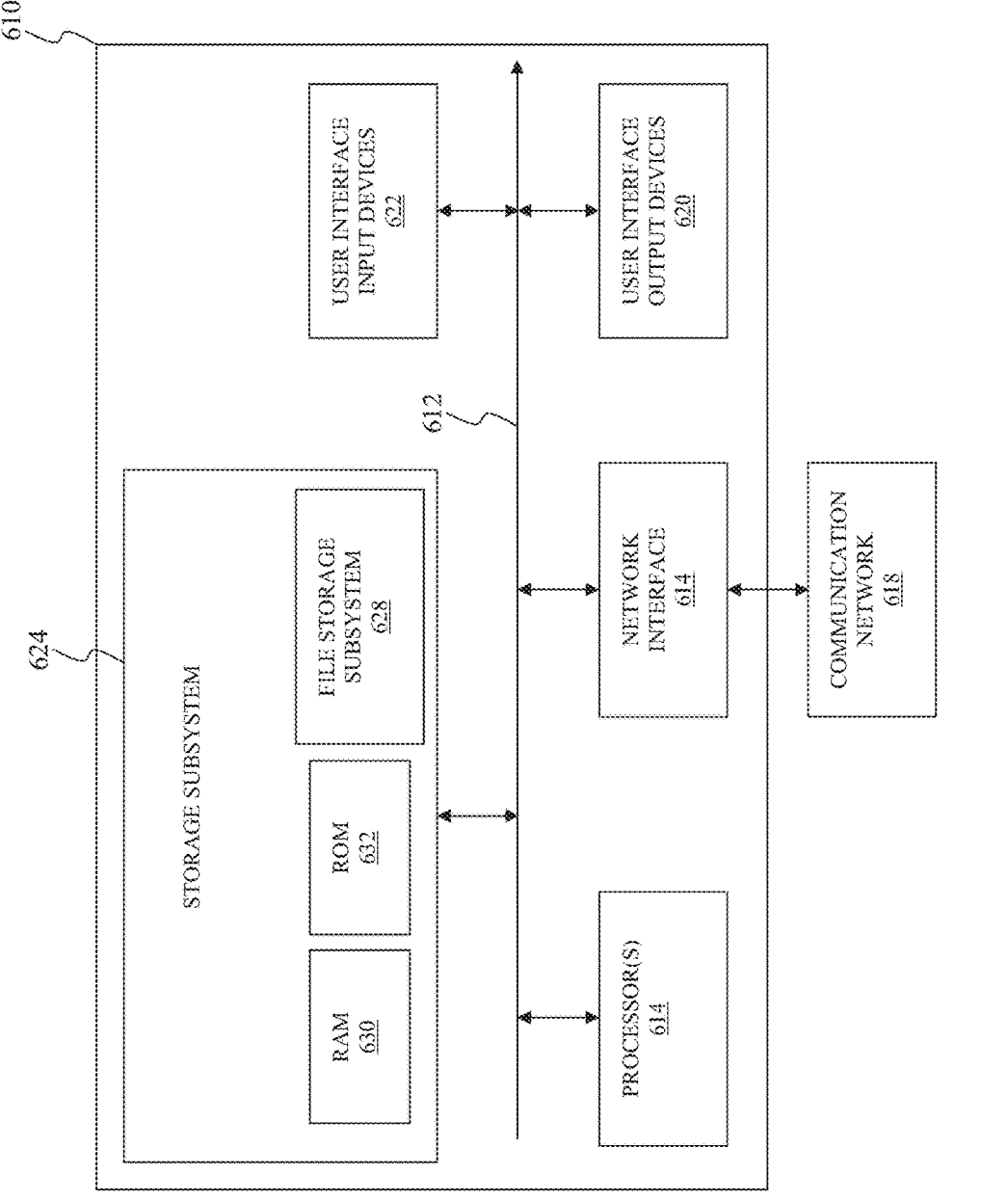

FIG. 4 illustrates a flowchart of a machine learning procedure for diagnosing the one or more potential sources of the one or more errors, faults, and/or failures within the exemplary service provider network and/or for identifying one or more recommended actions to be performed on these one or more potential sources to remedy these various errors, faults, and/or failures according to an exemplary embodiment of the present disclosure;

FIG. 5 graphically illustrates an exemplary machine learning procedure for identifying one or more recommended actions to remedy various errors, faults, and/or failures within the exemplary service provider network according to an exemplary embodiment of the present disclosure; and FIG. 6 graphically illustrates a simplified block diagram of a computer system suitable for use with embodiments described herein, as well as circuit design and circuit embodiments of the technology, according to an exemplary embodiment of the present disclosure.

The present disclosure will now be described with reference to the accompanying drawings.

DETAILED DESCRIPTION OF THE DISCLOSURE

Overview

Systems, methods, and apparatuses disclosed herein can diagnose one or more potential sources of various errors, faults, and/or failures within the service provider network and/or to identify various recommended actions to be performed on these one or more potential sources to remedy the errors, faults, and/or failures. These systems, methods, and apparatuses can execute one or more diagnostic tools to identify the one or more potential sources for the errors, faults, and/or failures and/or to identify the recommended actions to be performed on these one or more potential sources to remedy these errors, faults, and/or failures. These systems, methods, and apparatuses effectively combine the different conventional diagnostic tools into a seamless interactive visual interface to provide a holistic view of one or more customer premises within the service provider network. This allows personnel of the service provider network to quickly and/or accurately identify the one or more potential sources for the errors, faults, and/or failures and/or identify the recommended actions to be performed on these one or more potential sources to remedy these errors, faults, and/or failures.

Exemplary Service Provider Network

Figure 1:
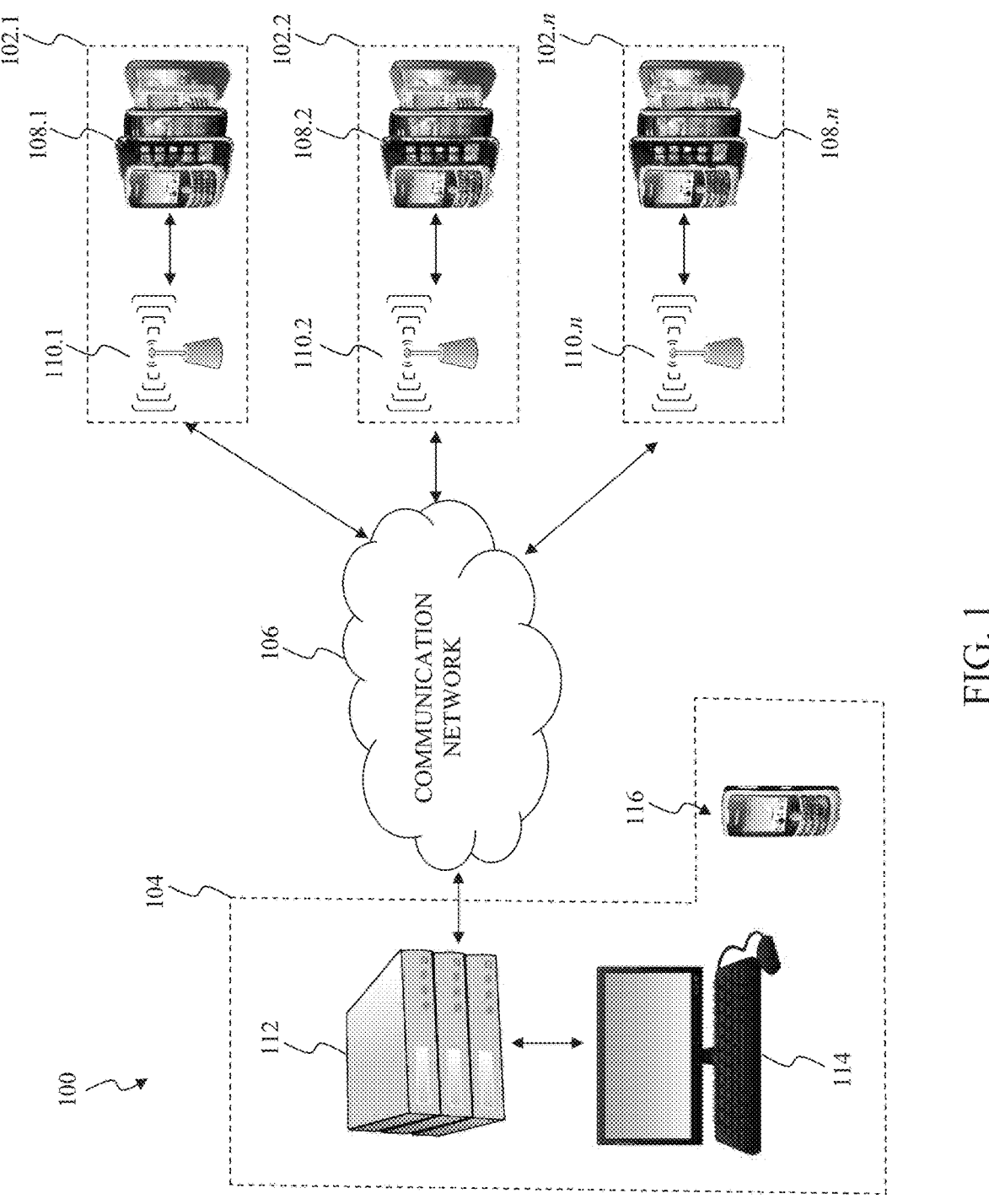

FIG. 1 graphically illustrates an exemplary service provider network according to an exemplary embodiment of the present disclosure. In the exemplary embodiment illustrated in FIG. 1, a service provider network 100 provides electronic communication between customer premises 102.1 through 102.n and a service provider system 104 via a communication network 106. The service provider system 104 can capture electronic device information relating to the operation of the customer premises 102.1 through 102.n. Thereafter, the service provider system 104 can execute a machine learning procedure to analyze the electronic device information to diagnose one or more potential sources of various errors, faults, and/or failures within the service provider network 100 and/or to identify various recommended actions to remedy these errors, faults, and/or failures. As used herein, the term "error" represents a human action that produces an incorrect result. As an example, an error can include simple errors, such as failing to plug the electronic device into an appropriate electrical socket, although more complex errors are possible as will be recognized by those skilled in the relevant art(s) without departing from the spirit and scope of the present disclosure. As used herein, the term "fault" represents a manifestation of an error in an electronic device of the service provider network 100, also known as a defect or a bug. A fault can be hardware-based that is manifested in the hardware of the service provider network 100 and/or software-based that is manifested in the software executing within the service provider network 100. As used herein, the term "failure" represents a deviation of an electronic device of the service provider network 100 from its intended operation. For example, a failure can occur when the electronic device produces an incorrect result or does not perform the correct action. As used herein, the term "recommended actions" represent possible actions to be performed by a customer service representative, a service technician, a subscriber of the service, and/or other personnel of the service provider network 100 onto one or more electronic devices situated within the customer premises 102.1 through 102.$n$, the service provider system 104, and/or the communication network 106 to remedy errors, faults, and/or failures within the service provider network 100. As to be described in further detail below, the recommended actions can include various acts ranging from relatively simple actions, such as, for example, cycling power to the one or more electronic devices, attaching, or re-attaching, a communications cable to the one or more electronic devices, downloading software and/or firmware on the one or more electronic devices, to more relatively complex actions, such as, for example, replacing an underground communications cable within the service provider network 100.

In the exemplary embodiment illustrated in FIG. 1, the customer premises 102.1 through 102.$n$ represent building and/or non-building structures that receive a service from the service provider network 100. Generally, the one or more building structures refer to any suitable structure or structures that are designed for human occupancy and can include one or more residential, industrial, and/or commercial building structures to provide some examples. Generally, the one or more non-building structures refer to any suitable structure or structures that are not designed for human occupancy and can include one or more residential, industrial, and/or commercial non-building structures to provide some examples. In an exemplary embodiment, the customer premises 102.1 through 102.$n$ represent building and/or non-building structures that have entered into service agreements with a service provider operating the service provider network 100 to provide a service for electronic communication, such as audio, video, and/or data communication to provide some examples, between the customer premises 102.1 through 102.$n$ and the service provider system 104. The service agreements often define quality of service (QoS), for example, speeds of the downstream direction or speeds of the upstream direction, between corresponding customer premises from among the customer premises 102.1 through 102.$n$ and the service provider system 104.

As illustrated in FIG. 1, each of the customer premises 102.1 through 102.$n$ includes corresponding electronic devices from among electronic media devices 108.1 through 108.$n$ and a corresponding access node from among access nodes 110.1 through 110.$n$. Those skilled in the relevant art(s) will recognize the customer premises 102.1 through 102.$n$ can include further electronic devices, such as electronic devices, such as gateways, routers, network bridges, modems, wireless access points, line drivers, switches, hubs, and/or repeaters, to provide some examples, which are not illustrated in FIG. 1 without departing from the spirit and scope of the present disclosure. In the exemplary embodiment illustrated in FIG. 1, the electronic media devices 108.1 through 108.$n$ can represent mobile telephony devices, such as mobile phones, mobile computing devices, mobile internet devices, such as tablet computers and/or laptop computers, video game consoles, portable media players, peripheral devices, such as wireless speakers, mice, keyboards, monitors, printers, and/or scanners, internet capable appliances, smart television, and/or other suitable communication devices that are capable of wireless communication that will be recognized by those skilled in the relevant art(s) without departing from the spirit and scope of the present disclosure. Alternatively, or in addition to, the electronic media devices 108.1 through 108.$n$ can include communication devices that are capable of wired communication, for example, via fiber-optics to provide an example, that will be recognized by those skilled in the relevant art(s) without departing from the spirit and scope of the present disclosure. The access nodes 110.1 through 110.$n$ represent interfaces between the service provider system 104 and the electronic media devices 108.1 through 108.$n$. In the exemplary embodiment illustrated in FIG. 1, the access nodes 110.1 through 110.$n$ represent wireless routers that allow communications between the communication network 106 and the electronic media devices 108.1 through 108.$n$. However, the access nodes 110.1 through 110.$n$ can alternatively, or additionally, represent other wireless access nodes, for example, wireless access points and/or wired access points, such as set-top boxes and/or digital subscriber line (DSL) modems to provide some examples, without departing from the spirit and scope of the present disclosure.

The service provider system 104 represents one or more computer systems, an exemplary embodiment of which is to be described in further detail below, which facilitate execution of the service. As used herein, the term "downstream direction" refers to the transfer of information from the service provider system 104 to the customer premises 102.1 through 102.$n$. The term "upstream direction" refers to the transfer of information from the customer premises 102.1 through 102.$n$ to the service provider system 104. In the exemplary embodiment illustrated in FIG. 1, the service provider system 104 can include a service provider server 112, an administrative system 114, and a portable diagnostic system 116. The service provider server 112 transmits information, for example, video, audio, and/or data, in the downstream direction to the customer premises 102.1 through 102.$n$ via the communication network 106 and/or receives information, for example, video, audio, and/or data, in the upstream direction from the customer premises 102.1 through 102.$n$ via the communication network 106 in accordance with the service. For example, the service provider server 112 can deliver media, such as movies, television programs, and/or advertising, to the customer premises 102.1 through 102.$n$ in the downstream direction. Moreover, the service provider server 112 can provide the customer premises 102.1 through 102.$n$ with connectivity to other networks, such as the public Internet to provide an example.

The administrative system 114 includes one or more computer systems, an exemplary embodiment of which is to be described in further detail below, to locally monitor operations of the service provider network 100 at the service provider system 104. The portable diagnostic system 116 includes one or more portable electronic devices, such as the one or more mobile telephony devices, the one or more mobile computing devices, and/or the one or more mobile internet devices to provide some examples, to remotely monitor operations of the service provider network 100 at the customer premises 102.1 through 102.$n$. Generally, the administrative system 114 and/or the portable diagnostic system 116 can diagnose whether various errors, faults, and/or failures are present within the service provider network 100, identify one or more potential sources of these errors, faults, and/or failures, and/or identify one or more recommended actions to be performed on these one or more potential sources to remedy these various errors, faults, and/or failures. As to be described in further detail below, the administrative system 114 and/or the portable diagnostic system 116 can execute one or more diagnostic tools to identify one or more potential sources of various errors, faults, and/or failures within the service provider network 100 and/or identify the one or more recommended actions to be performed on these one or more potential sources to remedy these various errors, faults, and/or failures. In an exemplary embodiment, the one or more diagnostic tools can include a machine learning procedure, which is to be described in further detail below, to identify one or more potential sources of various errors, faults, and/or failures within the service provider network 100 and/or identify the one or more recommended actions to be performed on these one or more potential sources to remedy these various errors, faults, and/or failures.

Figure 2:
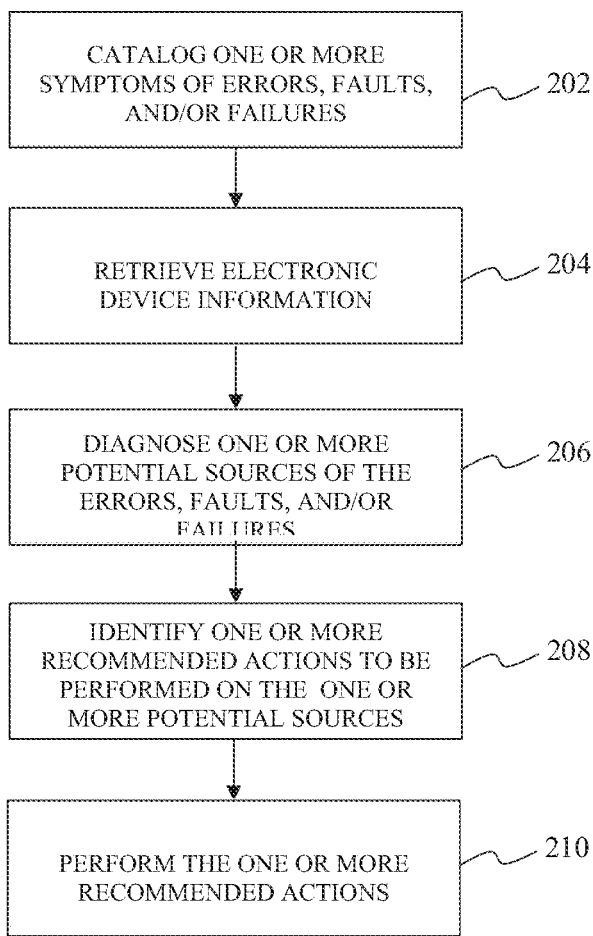
FIG. 2 illustrates a flowchart of an exemplary operation for diagnosing and/or remedying various errors, faults, and/or failures within the exemplary service provider network according to an exemplary embodiment of the present disclosure.

Exemplary Identifying and Remedying of Errors, Faults, and/or Failures within the Exemplary Service Provider Network FIG. 2 illustrates a flowchart of an exemplary operation for diagnosing and/or remedying various errors, faults, and/or failures within the exemplary service provider network according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 200 for diagnosing various errors, faults, and/or failures within a service provider network, such as the service provider network 100, and/or for identifying one or more recommended actions for remedying these errors, faults, and/or failures. The operational control flow 200 can be executed by one or more computer systems, such as the administrative system 114 and/or as the portable diagnostic system 116 as described above in FIG. 1.

At operation 202, the operational control flow 200 catalogs one or more symptoms of one or more errors, faults, and/or failures within the service provider network, herein referred to as "symptom data," as described by, for example, a subscriber of the service. In some embodiments, the symptom data can include information that the subscriber is experiencing a black screen, pixelization of a movie or a television program, lack of sound for the movie or television program, intermittent connectivity, slow speed, no Internet connectivity, no dial-tone, and/or an inability to receive electronic mail messages to provide some examples. In the exemplary embodiment illustrated in FIG. 2, the operational control flow 200 can receive an inquiry, such as a telephone call, a short message service (SMS) text message, or an electronic mail message to provide some examples, from the subscriber of the service. In some embodiments, the operational control flow 200 can receive the inquiry when a service associated with the service provider network is not performing as specified in a service agreement. In some embodiments, the operational control flow 200 can be executed proactively, as to be described below, without waiting for the inquiry.

At operation 204, the operational control flow 200 captures electronic device information from electronic devices within a customer premises, such as one of customer premises 102.1 through 102.$n$ as described above in FIG. 1, that are associated with the subscriber of the service. As to be described in further detail below, the operational control flow 200 can analyze the electronic device information to identify one or more errors, faults, and/or failures within the service provider network that can be outside the customer premises and/or inside the customer premises. For example, using FIG. 1 as an example, the operational control flow 200 can capture electronic device information from the electronic media devices 108.1 and the access node 110.1 when the customer premises 102.1 is associated with the subscriber of the service. The electronic device information can include configuration information and/or operational information of the electronic devices. The configuration information can include one or more parameters, characteristics, and/or attributes relating to the configuration of the electronic devices. The operational information can include one or more parameters, characteristics, and/or attributes relating to the operation of the electronic devices. In some embodiments, to be described in further detail below, the symptom data from operation 202 and the electronic device information from operation 204 can be collectively referred to as service provider network information.

At operation 206, the operational control flow 200 uses the symptom data from operation 202 and/or the electronic device information from operation 204 to diagnose one or more potential sources of the one or more errors, faults, and/or failures within the service provider network. The operational control flow 200 can execute a machine learning procedure, which is to be described in further detail below, to diagnose the one or more potential sources of the one or more errors, faults, and/or failures within the service provider network.

At operation 208, the operational control flow 200 identifies one or more recommended actions to be performed on the one or more potential sources from operation 206 to remedy the errors, faults, and/or failures from operation 206. The operational control flow 200 can execute the machine learning procedure to identify one or more recommended actions to be performed on the one or more potential sources from operation 206 to remedy the errors, faults, and/or failures from operation 206. As to be described in further detail below, the machine learning procedure utilizes the one or more potential sources from operation 206 to identify one or more recommended actions to remedy these errors, faults, and/or failures. The machine learning procedure can utilize the success and/or the failure of one or more previous recommended actions in remedying the one or more errors, faults, and/or failures within the service provider network to aid in identifying the one or more recommended actions.

At operation 210, the operational control flow 200 performs the one or more recommended actions from operation 208 on the one or more potential sources from operation 206 to remedy the one or more errors, faults, and/or failures within the service provider network. In some embodiments, the operational control flow 200 can further capture electronic device information from electronic devices within other customer premises, such as one or more the customer premises 102.2 through 102.$n$ as described above in FIG. 1, that are associated with the subscriber of the service in a substantially similar manner as described above in operation 204. In these embodiments, the operational control flow 200 can use the electronic device information from the electronic devices within these other customer premises to predict whether these errors, faults, and/or failures are to occur on those electronic devices within these other customer premises in the future. In these embodiments, the operational control flow 200 can perform the one or more recommended actions from operation 208 on those electronic devices within these other customer premises where these errors, faults, and/or failures are predicted to occur in the future.

Exemplary Diagnostic Tools

The disclosure to follow describes various exemplary embodiments of an exemplary diagnostic tool, which when executed by one or more computer systems, such as the administrative system 114 and/or as the portable diagnostic system 116 as described above in FIG. 1, can perform the operational control flow 200 as described above in FIG. 2. Alternatively, or in addition to, the execution of the exemplary diagnostic tool can be split among two or more computer systems, such as the administrative system 114 and/or as the portable diagnostic system 116 as described above in FIG. 1, which communicate amongst each other to perform the operational control flow 200 as described above in FIG. 2. For example, the portable diagnostic system 116 can perform the operation 202 as described above in FIG. 2 and thereafter send the symptom data to the portable diagnostic system 116. In this example, the administrative system 114 can perform the operation 204 through the operation 208 as described above in FIG. 2 and thereafter communicate the one or more recommended actions of operation 208 to the portable diagnostic system 116 to perform the one or more recommended actions in operation 210. As to be described in further detail below, these various exemplary embodiments of the diagnostic tool can capture electronic device information from one or more electronic devices, such as one of the electronic media devices 108.1 through 108.$n$ and/or one of the access nodes 110.1 through 110.$n$ as described above in FIG. 1, within the customer premises. Some of these various exemplary embodiments of the diagnostic tool can present this electronic data in a seamless interactive visual interface to quickly and/or accurately identify one or more recommended actions to remedy various errors, faults, and/or failures within a service provider network, such as the service provider network 100 to provide an example. Some of these various exemplary embodiments of the diagnostic tool can execute a machine learning procedure to identify one or more potential sources of one or more errors, faults, and/or failures within the service provider network and/or identify one or more recommended actions to be performed on these one or more potential sources to remedy these errors, faults, and/or failures.

Exemplary Diagnostic Interface of the Diagnostic Tool

FIG. 3 illustrates an exemplary diagnostic interface for an exemplary diagnostic tool according to an exemplary embodiment of the present disclosure. As illustrated in FIG. 3, the exemplary diagnostic tool, which when executed by one or more computer systems, such as the administrative system 114 and/or as the portable diagnostic system 116 as described above in FIG. 1, can provide a diagnostic interface 300 to a customer service representative, a service technician, and/or other personnel of the service provider system, and/or to a subscriber of the service, for example, via a customer application, a portal, a short message service, and/or an interactive chat. The diagnostic interface 300 can provide a real-time, or near real-time, holistic view of a customer premises, such as one of the customer premises 102.1 through 102.$n$ as described above in FIG. 1. Moreover, the diagnostic interface 300 can present electronic device information captured from one or more electronic devices, such as one of the electronic media devices 108.1 through

108.$n$ and/or one of the access nodes 110.1 through 110.$n$ as described above in FIG. 1, and/or the one or more recommended actions to remedy the one or more errors, faults, and/or failures within a service provider network, such as the service provider network 100 to provide an example, in a seamless interactive visual interface. This allows the customer service representative, the service technician, and/or the other personnel of the service provider system interfacing with the diagnostic interface 300 to quickly and/or accurately identify one or more potential sources of one or more errors, faults, and/or failures within the service provider network and/or identify one or more recommended actions to be performed on these sources to remedy various errors, faults, and/or failures within the service provider network.

In the exemplary embodiment illustrated in FIG. 3, the diagnostic interface 300 includes a customer premise network topology 302 that represents a graphical representation of the one or more electronic devices situated within the customer premises. As illustrated in FIG. 3, the customer premise network topology 302 represents a graphical illustration of the one or more electronic devices situated within the customer premises as well as interconnections and/or associations between these electronic devices. Although not illustrated in FIG. 3, the graphical illustration of the one or more electronic devices as well as the interconnections and/or the associations between these electronic devices can be overlaid onto a two-dimensional or three-dimensional representation of a floorplan of the customer premises.

The customer premise network topology 302 provides a real-time, or near real-time, holistic view of the customer premises allowing for quick identification of the one or more potential sources of the one or more errors, faults, and/or failures within the service provider network, and/or more accurate determining of one or more recommended actions to be performed on these one or more potential sources to remedy the various errors, faults, and/or failures. As illustrated in FIG. 3, the customer premise network topology 302 includes one or more graphical icons 304.1 through 304.$s$. The one or more graphical icons 304.1 through 304.$s$ graphically represent the one or more electronic devices situated within the customer premises at their corresponding locations within the customer premises. For example, as illustrated in FIG. 3, the graphical icons 304.1 through 304.4 represent one or more portable electronic devices, such as the electronic media devices 108.1 through 108.$n$ as described above in FIG. 1, situated within the customer premises at their corresponding locations within the customer premises. In this example, the graphical icon 304.$s$ represents an access node, such as one of the access nodes 110.1 through 110.$n$ as described above in FIG. 1, situated within the customer premises at its corresponding location within the customer premises. As further illustrated in FIG. 3, the customer premise network topology 302 illustrates interconnections and/or associations between the graphical icons 304.1 through 304.$s$ to provide the real-time, or near real-time, holistic view of the customer premises.

As described above in FIG. 1 and FIG. 2, the exemplary diagnostic tool, which when executed by the one or more computer systems, can capture electronic device information from the one or more electronic devices situated within the customer premises. In the exemplary embodiment illustrated in FIG. 3, the customer service representative, the service technician, and/or the other personnel of the service provider system, and/or the subscriber of the service can select any of graphical icons from among the one or more graphical icons 304.1 through 304.$s$ in the diagnostic interface 300 to display electronic device information 306 corresponding to the electronic device that is associated with the selected graphical icon. As illustrated in FIG. 3, the customer service representative, the service technician, and/or the other personnel of the service provider system, and/or the subscriber of the service can select, for example, "click-on," a graphical icon from among the one or more graphical icons 304.1 through 304.s in the diagnostic interface 300. The exemplary diagnostic tool, in response to this selection, can display electronic device information 306 corresponding to the electronic device that is associated with the selected graphical icon. In the exemplary embodiment illustrated in FIG. 3, the electronic device information 306 can include various parameters, characteristics, and/or attributes relating to the configuration, also referred to as electronic device configuration information, of the electronic device that is associated with the selected graphical icon and/or the operation, also referred to as electronic device operational information, of the electronic device that is associated with the selected graphical icon. As illustrated in FIG. 3, the electronic device configuration information can include the make, model, type or brand of the electronic device that is associated with the selected graphical icon; one or more identifiers for the network that is associated with this electronic device, such as a network identifier (ID) or a network name to provide some examples; one or more locations of this electronic device within the customer premises; one or more device identifiers of this electronic device, such as a serial number, a Media Access Controller (MAC) address, and/or an Internet Protocol (IP) address to provide some examples; and/or one or more statuses of this electronic device, for example, power status information, channel tuning information, device re-boot information, and/or software version installed on this electronic device. In some embodiments, the electronic device operational information can further include provisioning information of the electronic device that is associated with the selected graphical icon, such as a name of the subscriber, an address of the customer premise, an electronic mail address of the subscriber, a telephone number associated with the subscriber, and/or a payment history of the subscriber. The operational information can include signal strengths of the electronic device that is associated with the selected graphical icon, receiving signal strength of this electronic device, transmitting signal strength of this electronic device, speeds of the downstream direction, speeds of the upstream direction, modulation of the digital data being carried, and/format of the digital data being carried to provide some examples. In some embodiments, the electronic device information 306 can include historical information of the electronic device that is associated with the selected graphical icon that identifies one or more errors, faults, and/or failures that were previously present in this electronic device, one or more potential sources of these previous errors, faults, and/or failures, and/or one or more previous actions that were performed one these one or more potential sources to remedy these previous errors, faults, and/or failures. In some embodiments, the operational information can further include health information, for example, a health score, of the electronic device that is associated with the selected graphical icon.

In the exemplary embodiment illustrated in FIG. 3, the electronic device information 306 is arranged to be a hierarchical menu of the electronic device information that is captured from the electronic device that is associated with the selected graphical icon. As illustrated in FIG. 3, the hierarchical menu includes one or more broad fields of electronic device information, such as configuration information, operational information, and/or historical information. The customer service representative, the service technician, and/or the other personnel of the service provider system, and/or the subscriber of the service can select, for example, "click-on," one or more of these broad fields of electronic device information to expand these broad fields of electronic device information to display specific fields of electronic device information that is associated with the selected category of electronic device information. For example, the customer service representative, the service technician, and/or the other personnel of the service provider system, and/or the subscriber of the service can select the configuration information field of electronic device information to display the make, model, type or brand of the electronic device, the one or more identifiers for the network, the one or more locations of the electronic device within the customer premises, the one or more device identifiers of the electronic device, and the one or more statuses of the electronic device as illustrated in FIG. 3.

Moreover, as described above in FIG. 1 and FIG. 2, the exemplary diagnostic tool, which when executed by the one or more computer systems, can identify one or more potential sources of errors, faults, and/or failures, and/or can identify one or more recommended actions to be performed on these one or more potential sources to remedy these various errors, faults, and/or failures. In the exemplary embodiment illustrated in FIG. 3, the diagnostic tool can integrate these one or more potential sources of the errors, faults, and/or failures and/or the one or more recommended actions to be performed on these one or more potential sources within the electronic device information 306. This allows the customer service representative, the service technician, and/or the other personnel to quickly and/or accurately identify the one or more potential sources for the errors, faults, and/or failures and/or identify the recommended actions to be performed on these one or more potential sources to remedy these errors, faults, and/or failures. In the exemplary embodiment illustrated in FIG. 3, the exemplary diagnostic tool, which when executed by the one or more computer systems, can display, for example, mark, the one or more potential sources of the errors, faults, and/or failures within the electronic device information 306 corresponding to the electronic device that is associated with the selected graphical icon. For example, as illustrated in FIG. 3, the exemplary diagnostic tool can identify the Current Power Status field of the electronic device that is associated with the selected graphical icon as being the one or more potential sources of the errors, faults, and/or failures. In this example, the exemplary diagnostic tool can mark, for example, highlight, the value of the Current Power Status field, namely, Standby, as being the one or more potential sources of the errors, faults, and/or failures.

In the exemplary embodiment illustrated in FIG. 3, the exemplary diagnostic tool can overlay one or more selection prompts which corresponds to the one or more potential sources of the one or more errors, faults, and/or failures within the diagnostic interface 300. The customer service representative, the service technician, and/or the other personnel of the service provider system, and/or the subscriber of the service can select, for example, "click-on," the one or more selection prompts to display the one or more recommended actions to be performed on these one or more potential sources to remedy these various errors, faults, and/or failures. For example, as illustrated in FIG. 3, the customer service representative, the service technician, and/or the other personnel of the service provider system, and/or the subscriber of the service can select a selection prompt 308 that corresponds to the Current Power Status field which has been identified as being the one or more potential sources of the one or more errors, faults, and/or failures. In this example, the exemplary diagnostic tool displays, in response to selecting the selection prompt 308, one or more recommended actions 310 to be performed on the electronic device that is associated with the selected graphical icon to remedy the one or more errors, faults, and/or failures. In the exemplary embodiment illustrated in FIG. 3, the one or more recommended actions 310 identifies one or more actions to be performed, for example, Toggle Power, on the electronic device that is associated with the selected graphical icon to remedy the one or more errors, faults, and/or failures. The one or more recommended actions 310 can also include one or more instructions to be performed by the customer service representative, the service technician, and/or the other personnel of the service provider system, and/or the subscriber of the service to perform the one or more actions identified in the one or more recommended actions 310.

Optionally, the diagnostic interface 300 can selectively include visual representations 312 of the electronic device information from any of the one or more electronic devices situated within the customer premises overlaid onto the customer premise network topology 302. For example, as illustrated in FIG. 3, the diagnostic interface 300 can include one or more concentric circles overlaid onto the customer premise network topology 302 representing the signal strength of the access point within the customer premises. Although not illustrated in FIG. 3, these concentric circles can be color coded to allow the signal strength of the access point to be easily visualized. In the exemplary illustrated in FIG. 3, a first, inner concentric circle encompassing the access point from among the one or more concentric circles indicates an area of high signal strength, a second, middle concentric circle from among the one or more concentric circles indicates an area of medium signal strength, and a third, outer concentric circle from among the one or more concentric circles indicates an area of low signal strength. However, it should be noted the diagnostic interface 300 can include other visual representations 312 of other electronic device information 306.1 through 306.s overlaid onto the customer premise network topology 302 without departing from the spirit and scope of the present disclosure.

Exemplary Machine Learning Procedure

As described above, the exemplary diagnostic tool can diagnose one or more potential sources of various errors, faults, and/or failures within the service provider network, such as the service provider network 100, and/or to identify one or more recommended actions to be performed on these one or more potential sources to remedy these errors, faults, and/or failures. In an exemplary embodiment, the exemplary diagnostic tool can include a machine learning procedure, which is to be described in further detail below, to identify the one or more recommended actions to be performed on these one or more potential sources to remedy the various errors, faults, and/or failures within the service provider network.

FIG. 4 illustrates a flowchart of a machine learning procedure for diagnosing the one or more potential sources of the one or more errors, faults, and/or failures within the exemplary service provider network and/or for identifying one or more recommended actions to be performed on these one or more potential sources to remedy these various errors, faults, and/or failures according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 400 for diagnosing the one or more potential sources of the one or more errors, faults, and/or failures within a service provider network, such as the service provider network 100, and/or for identifying one or more recommended actions to be performed on these one or more potential sources to remedy these various errors, faults, and/or failures. In the exemplary embodiment illustrated in FIG. 4, one or more computer systems, such as the administrative system 114 and/or as the portable diagnostic system 116 as described above in FIG. 1, can execute the exemplary diagnostic tool to perform the operational control flow 400 as to be described in further detail below.

At operation 402, the operational control flow 400 retrieves service provider network information. The operational control flow 400 can retrieve electronic device information from one or more electronic devices, such as one of the electronic media devices 108.1 through 108.n and/or one of the access nodes 110.1 through 110.n as described above in FIG. 1, within a customer premises, such as the customer premises 102.1 to provide an example. In an exemplary embodiment, the service provider network information can include electronic device information from one electronic device, multiple electronic devices, or all of the electronic devices within the customer premises. Alternatively, or in addition to, the service provider network information can include electronic device information from other electronic devices from other customer premises within the service provider network, such as the customer premises 102.2 through 102.n to provide an example. The operational control flow 400 can alternatively, or additionally, retrieve symptom data indicative of one or more symptoms of one or more errors, faults, and/or failures within the service provider network.

At operation 404, the operational control flow 400 executes a machine learning procedure utilizing the service provider network information from operation 402 to diagnose the one or more potential sources of the one or more errors, faults, and/or failures within the service provider network. In the exemplary embodiment illustrated in FIG. 4, the machine learning procedure can utilize a supervised learning machine learning algorithm. However, those skilled in the relevant art(s) will recognize that any suitable semi-supervised and/or any suitable unsupervised machine learning algorithms can be utilized without departing from the spirit and scope of the present disclosure. In the exemplary embodiment illustrated in FIG. 4, the operational control flow 400 constructs a mathematical model of the one or more potential sources of the errors, faults, and/or failures within the service provider network. The mathematical model can be used to effectively diagnose the one or more potential sources of the one or more errors, faults, and/or failures within the service provider network. For example, the mathematical model effectively maps the service provider network information from operation 402 to a score representing a diagnosis of the one or more potential sources of the one or more errors, faults, and/or failures within the service provider network. In some situations, the operational control flow 400 can develop, or train, the mathematical model utilizing known training data representing known service provider network information from known sources of the one or more errors, faults, and/or failures within the service provider network. In these situations, the operational control flow 400 can develop the mathematical model using the known training data until the operational control flow

400 can identify one or more potential sources of the errors, faults, and/or failures within the service provider network which are actually the sources of the errors, faults, and/or failures within the service provider network.

At operation 406, the operational control flow 400 identifies the one or more recommended actions to be performed on the one or more potential sources from operation 404 to remedy the various errors, faults, and/or failures within the service provider network. For example, the operational control flow 400 can utilize the score from operation 404 to identify the one or more recommended actions to be performed on the one or more potential sources from operation 404 to remedy these errors, faults, and/or failures. For example, the operational control flow 400 can store a catalog of recommended actions, which each recommend action from among the catalog of recommended actions corresponding to a score or a range of scores. In this exemplary embodiment, the operational control flow 400 can utilize the score from operation 404 to identify the one or more recommended actions from among the catalog of recommended actions. In some situations, the operational control flow 400 can develop, or train, the mathematical model from operation 404 utilizing known training data representing known actions to be performed on known sources of errors, faults, and/or failures within the service provider network. In these situations, the operational control flow 400 can develop the mathematical model using the known training data until the operational control flow 400 can identify one or more recommended actions to be performed on the one or more potential sources from operation 404 which actually remedy these known errors, faults, and/or failures when performed on the one or more potential sources from operation 404. In an exemplary embodiment, the operational control flow 400 can optionally provide an indication as to whether the one or more recommended actions when performed on the one or more potential sources actually remedied the errors, faults, and/or failures within the service provider network to further develop, or train, the mathematical model from operation 406.

FIG. 5 graphically illustrates an exemplary machine learning procedure for identifying one or more recommended actions to remedy various errors, faults, and/or failures within the exemplary service provider network according to an exemplary embodiment of the present disclosure. In the exemplary embodiment illustrated in FIG. 5, one or more computer systems, such as the administrative system 114 and/or as the portable diagnostic system 116 as described above in FIG. 1, can execute the exemplary diagnostic tool to perform a machine learning procedure 500 as to be described in further detail below. As to be described in further detail below, the machine learning procedure 500 can transform service provider network information, such as the service provider network information as described above in FIG. 4, into a vector of numerical features, also referred to as a feature vector, which can be scaled with various weights of a mathematical model to construct a linear predictor function that is used to determine a score. The machine learning procedure 500 can utilize the score to identify the one or more recommended actions to remedy the various errors, faults, and/or failures within the service provider network.

As illustrated in FIG. 5, the machine learning procedure 500 retrieves service provider network information 502. The service provider network information 502 can include electronic device information captured by the operational control flow 500 from one or more electronic devices, such as one of the electronic media devices 108.1 through 108.$n$ and/or one of the access nodes 110.1 through 110.$n$ as described above in FIG. 1, within a customer premises, such as the customer premises 102.1 to provide an example. In an exemplary embodiment, the service provider network information can include electronic device information from one electronic device, multiple electronic devices, or all of the electronic devices within the customer premises. Alternatively, or in addition to, the service provider network information can include electronic device information from other electronic devices from other customer premises within the service provider network, such as the customer premises 102.2 through 102.$n$ to provide an example. The operational control flow 500 can alternatively, or additionally, retrieve symptom data indicative of one or more symptoms of one or more errors, faults, and/or failures within the service provider network. In the exemplary embodiment illustrated in FIG. 5, the machine learning procedure 500 can transform the service provider network information 502 into a vector of numerical features corresponding to one or more variables $X_1$ through $X_K$ of a mathematical model 504. In this exemplary embodiment, the machine learning procedure 500 can optionally standardize, or normalize, the service provider network information 502, for example, to a value between zero (0) and one (1). Alternatively, or in addition to, the machine learning procedure 500 can assign a value of zero (0) to one or more variables $X_1$ through $X_K$ corresponding to a symptom of the one or more errors, faults, and/or failures within the service provider network indicating the absence of the symptom or a value of one (1) to one or more variables $X_1$ through $X_K$ corresponding to the symptom indicating the presence of the symptom. For example, when the subscriber describes the one or more symptoms of one or more problems with the service as including a black screen, the machine learning procedure 500 can assign a value of one (1) to a variable $X_1$ indicating the presence of the black screen.

In the exemplary embodiment illustrated in FIG. 5, the machine learning procedure 500 includes numerical coefficient operation 506 to estimate one or more numerical coefficients $A_1$ through $A_K$ of the mathematical model 504. The magnitude of the one or more numerical coefficients $A_1$ through $A_K$ can assess the practical significance of the effect of their corresponding one or more variables $X_1$ through $X_K$. The numerical coefficient operation 506 can adaptively update the one or more numerical coefficients $A_1$ through $A_K$ through, for example, a least-squares algorithm, such as the widely known Least Mean Squared (LMS), Recursive Least Squares (RLS), Minimum Mean Squared Error (MMSE) algorithms or any suitable equivalent algorithm that yields a least-squares result, a gradient descent, and/or regularization to provide some examples. Moreover, the numerical coefficient operation 506 compares a score Y of the mathematical model 504 with a score, or range of scores, of one or more recommended actions from among one or more recommended actions 510.1 through 510.$m$, to be discussed in further detail below, that actually remedied the one or more errors, faults, and/or failures within the service provider network to generate an error score. The numerical coefficient operation 506 thereafter adjusts the one or more numerical coefficients $A_1$ through $A_K$ to effectively minimize this error score.

As illustrated in FIG. 5, the machine learning procedure 500 includes a recommended action operation 508 that includes one or more recommended actions 510.1 through 510.$m$ to remedy the various errors, faults, and/or failures within the service provider network. In the exemplary embodiment illustrated in FIG. 5, each recommend action from among the one or more recommended actions 510.1 through 510.*m* corresponds to a score or a range of scores. In this exemplary embodiment, the recommended action operation 508 identifies one or more recommended actions from among the one or more recommended actions 510.1 through 510.*m* based upon the score of the mathematical model 504. In an exemplary embodiment, the recommended action operation 508 can identify the one or more recommended actions from among the one or more recommended actions 510.1 through 510.*m* which correspond to the score of the mathematical model 504. In another example, the recommended action operation 508 can identify the one or more recommended actions from among the one or more recommended actions 510.1 through 510.*m* which are a score threshold of the score of the mathematical model 504. This other example, allows the recommended action operation 508 to identify multiple recommended actions from among the one or more recommended actions 510.1 through 510.*m*.

Exemplary Computer System that can be Utilized to Implement Devices within the Exemplary Wireless Network FIG. 6 graphically illustrates a simplified block diagram of a computer system suitable for use with embodiments described herein, as well as circuit design and circuit embodiments of the technology, according to an exemplary embodiment of the present disclosure. The various electronic devices, for example, the service provider system 104 and/or the portable diagnostic system 116, as described above can be implemented in hardware, firmware, software, or any combination thereof. The discussion of FIG. 6 to follow describes an exemplary computer system 610 that can be used for these electronic devices.

In the exemplary embodiment illustrated in FIG. 6, the computer system 610 typically includes at least one processor 614 which communicates with a number of peripheral devices via bus subsystem 612. Typically, the at least processor 614 can include, or can be, any of a microprocessor, graphics processing unit, or digital signal processor, and their electronic processing equivalents, such as an Application Specific Integrated Circuit ("ASIC") or Field Programmable Gate Array ("FPGA"). As used herein, the term "processor" signifies a tangible data and information processing device that physically transforms data and information, typically using a sequence transformation (also referred to as "operations"). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements. The processor can be electronic, for example, comprising digital logic circuitry (for example, binary logic), or analog (for example, an operational amplifier). The processor may also operate to support performance of the relevant operations in a "cloud computing" environment or as a "software as a service" (SaaS). For example, at least some of the operations may be performed by a group of processors available at a distributed or remote system, these processors accessible via a communications network (e.g., the Internet) and via one or more software interfaces (e.g., an application program interface (API).)

The computer system typically includes an operating system, such as Microsoft's Windows, Sun Microsystems's Solaris, Apple Computer's MacOs, Linux or UNIX. The computer system also typically can include a Basic Input/

Output System (BIOS) and processor firmware. The operating system, BIOS and firmware are used by the processor to control subsystems and interfaces coupled to the processor. Typical processors compatible with these operating systems include the Pentium and Itanium from Intel, the Opteron and Athlon from Advanced Micro Devices, and the ARM processor from ARM Holdings.

As illustrated in FIG. 6, these peripheral devices may include a storage subsystem 624, comprising a memory subsystem 626 and a file storage subsystem 628, user interface input devices 622, user interface output devices 620, and a network interface subsystem 616. The input and output devices allow user interaction with computer system 610. In the exemplary embodiment illustrated in FIG. 6, the network interface subsystem 616 provides an interface to outside networks, including an interface to a communication network 618, and is coupled via a communication network 618 to corresponding interface devices in other computer systems or machines. The communication network 618 may comprise many interconnected computer systems, machines and communication links. These communication links may be wired links, optical links, wireless links, or any other devices for communication of information. The communication network 618 can be any suitable computer network, for example a wide area network such as the Internet, and/or a local area network such as Ethernet. The communication network 618 can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

The user interface input devices 622 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term "input device" is intended to include all possible types of devices and ways to input information into the computer system 610 or onto the communication network 618. The user interface input devices 622 typically allow a user to select objects, icons, text and the like that appear on some types of user interface output devices, for example, a display subsystem.

The user interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from the computer system 610 to the user or to another machine or computer system.

The memory subsystem 626 typically includes a number of memories including a main random-access memory ("RAM") 630 (or other volatile storage device) for storage of instructions and data during program execution and a read only memory ("ROM") 632 in which fixed instructions are stored. The file storage subsystem 628 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 628.

The bus subsystem 612 provides a device for letting the various components and subsystems of the computer system 610 communicate with each other as intended. Although the bus subsystem 612 is shown schematically as a single bus, alternative embodiments of the bus subsystem may use multiple busses. For example, RAM-based main memory can communicate directly with file storage systems using Direct Memory Access ("DMA") systems.

CONCLUSION

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A method, comprising:

displaying, by one or more computer systems, a customer premise network topology onto a graphical diagnostic interface having a plurality of graphical icons that are overlaid onto a floorplan of a customer premises, each graphical icon of the plurality of graphical icons being associated with a corresponding electronic device of a plurality of electronic devices situated within the customer premises;

receiving, by the one or more computer systems, a selection of a graphical icon of the plurality of graphical icons;

displaying, by the one or more computer systems in response to receiving the selection of the graphical icon, an electronic device information received from an electronic device of the plurality of electronic devices, the electronic device information including a plurality of fields of electronic device information, wherein the electronic device is associated with the graphical icon;

expanding a field of the electronic device information into a second plurality of fields of the electronic device information that is associated with the graphical icon, the plurality of fields of the electronic device information and the second plurality of fields of the electronic device information being a hierarchical menu of the electronic device information that has been captured from the electronic device;

identifying, among the second plurality of fields of the electronic device information, a field representing a potential source of one or more errors, faults, or failures;

marking the field representing the potential source of the one or more errors, faults, or failures;

overlaying a selection prompt within the electronic device information that corresponds to the field representing the potential source of the one or more errors, faults, or failures;

receiving, by the one or more computer systems, a selection of the field of the electronic device information; and displaying, by the one or more computer systems via the graphical diagnostic interface, in response to receiving the selection of the field of the electronic device information, the recommended remedial action associated with the one or more errors, faults, or failures.

2. The method of claim 1, wherein displaying the electronic device information further comprises:

overlaying the electronic device information onto the customer premise network topology in response to receiving the selection of the graphical icon.

3. The method of claim 1, wherein receiving the selection of the field of the electronic device information further comprises:

receiving the selection of the field of the electronic device information from among the second plurality of fields of the electronic device information.

4. The method of claim 1, wherein integrating the potential source of the one or more errors, faults, or failures and a recommended remedial action into the plurality of fields of the electronic device information further comprises:

executing a machine learning procedure to analyze the electronic device information to identify the potential source of the one or more errors, faults, or failures and the recommended action to remedy the one or more errors, faults, or failures.

5. The method of claim 1, further comprising:

overlaying, by the one or more computer systems, one or more fields of the electronic device information from among the plurality of fields of the electronic device information as one or more concentric circles onto the floorplan of the customer premises.

6. The method of claim 1, wherein the electronic device information comprises configuration information of the electronic device, the configuration information including at least one of: a make, a model, a type of the electronic device, a network identifier, a location of the electronic device within the customer premises, a device identifier, or a status of the electronic device.

7. The method of claim 1, wherein the electronic device information comprises operational information of the electronic device, the operational information including at least one of: a receiving signal strength, a transmitting signal strength, a speed of a downstream direction, or a speed of an upstream direction.

8. The method of claim 1, wherein the electronic device information comprises a health score of the electronic device.

9. The method of claim 1, wherein the electronic device information comprises historical information of the electronic device that identifies one or more previous errors, faults, or failures that were previously present in the electronic device, one or more potential sources of the previous errors, faults, or failures, and one or more previous actions that were performed on the one or more potential sources to remedy the previous errors, faults, or failures.

10. The method of claim 1, further comprising:

constructing a mathematical model to map the electronic device information to a score representing a selection of the potential source of the one or more errors, faults, or failures.

11. A computer system, comprising:

a memory; and a processor coupled to the memory, the processor configured to:

display a customer premise network topology onto a graphical diagnostic interface having a plurality of graphical icons that are overlaid onto a floorplan of a customer premises, each graphical icon of the plurality of graphical icons being associated with a corresponding electronic device of a plurality of electronic devices situated within the customer premises;

receive a selection of a graphical icon of the plurality of graphical icons;

display, in response to receiving the selection of the graphical icon, an electronic device information received from an electronic device of the plurality of electronic devices, the electronic device information including a plurality of fields of electronic device information, wherein the electronic device is associated with the graphical icon;

expand a field of the electronic device information into a second plurality of fields of the electronic device information that is associated with the graphical icon, the plurality of fields of the electronic device information and the second plurality of fields of the electronic device information being a hierarchical menu of the electronic device information that has been captured from the electronic device;

identify, among the second plurality of fields of the electronic device information, a field representing a potential source of one or more errors, faults, or failures;

mark the field representing the potential source of the one or more errors, faults, or failures;

overlay a selection prompt within the electronic device information that corresponds to the field representing the potential source of the one or more errors, faults, or failures;

receive a selection of the field of the electronic device information; and display, via the graphical diagnostic interface, in response to receiving the selection of the field of the electronic device information, the recommended remedial action associated with the one or more errors, faults, or failures.

12. The computer system of claim 11, wherein displaying the electronic device information further comprises:

overlaying the electronic device information onto the customer premise network topology in response to receiving the selection of the graphical icon.

13. The computer system of claim 11, wherein receiving the selection of the field of the electronic device information further comprises:

receiving the selection of the field of the electronic device information from among the second plurality of fields of the electronic device information.

14. The method of claim 11, wherein integrating the potential source of the one or more errors, faults, or failures and a recommended remedial action into the plurality of fields of the electronic device information further comprises:

executing a machine learning procedure to analyze the electronic device information to identify the potential source of the one or more errors, faults, or failures and the recommended action to remedy the one or more errors, faults, or failures.

15. The computer system of claim 11, wherein the processor is further configured to:

overlay one or more fields of the electronic device information from among the plurality of fields of the electronic device information as one or more concentric circles onto the floorplan of the customer premises.

16. A computer system, comprising:

a display subsystem configured to display a customer premise network topology onto a graphical diagnostic interface having a plurality of graphical icons that are overlaid onto a floorplan of a customer premises, each graphical icon of the plurality of graphical icons being associated with a corresponding electronic device of a plurality of electronic devices situated within the customer premises; and a processor configured to receive a selection of a graphical icon of the plurality of graphical icons;

wherein the display subsystem is further configured to display, in response to the selection of the graphical icon, electronic device information received from an electronic device of the plurality of electronic devices that is associated with the graphical icon onto the graphical diagnostic interface, the electronic device information including a plurality of fields of electronic device information, wherein the processor is further configured to:

expand a field of the electronic device information into a second plurality of fields of the electronic device information that is associated with the graphical icon, the plurality of fields of the electronic device information and the second plurality of fields of the electronic device information being a hierarchical menu of the electronic device information that has been captured from the electronic device;

identify, among the second plurality of fields of the electronic device information, a field representing a potential source of one or more errors, faults, or failures;

mark the field representing the potential source of the one or more errors, faults, or failures;

overlay a selection prompt within the electronic device information that corresponds to the field representing the potential source of the one or more errors, faults, or failures;

receive a selection of the field of the electronic device information; and wherein the display subsystem is further configured to display, in response to the selection of the field of electronic device information, the recommended remedial action onto the graphical diagnostic interface.

17. The computer system of claim 16, wherein the display subsystem is further configured to overlay the electronic device information onto the customer premise network topology in response to receiving the selection of the graphical icon.

18. The computer system of claim 16, wherein the processor is further configured to receive the selection of the field of the electronic device information from among the second plurality of fields of the electronic device information.

19. The computer system of claim 16, wherein the processor is further configured to execute a machine learning procedure to analyze the electronic device information to identify the potential source of the one or more errors, faults, or failures and the recommended action to remedy the one or more errors, faults, or failures.

* * * * *